S. PERRY.
Apparatus for Exhibiting Stereoscopic Pictures.
No. 24,327.  Patented June 7, 1859.
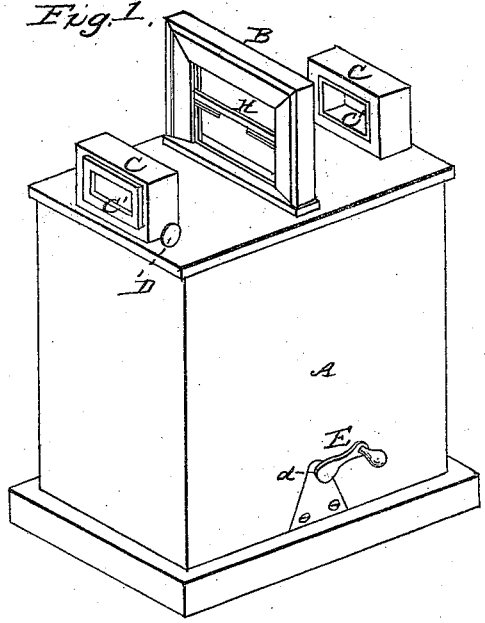
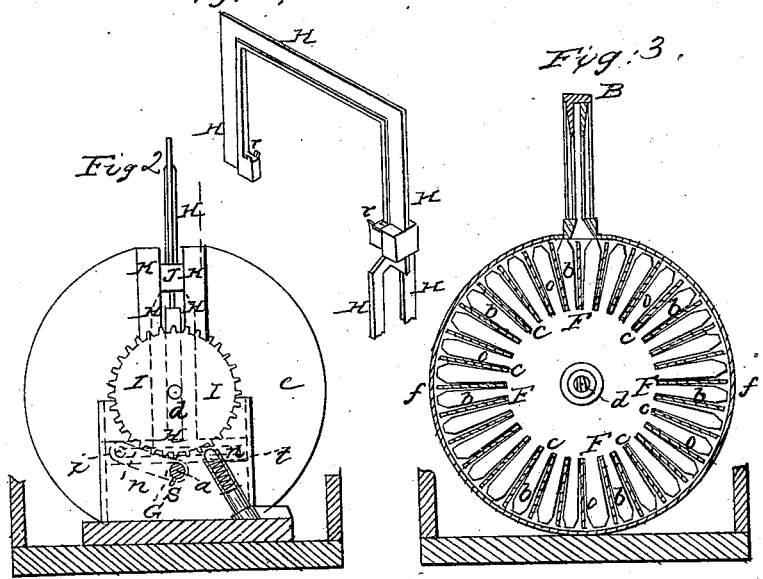

UNITED STATES PATENT OFFICE.

STUART PERRY, OF NEWPORT, NEW YORK.

APPARATUS FOR EXHIBITING STEREOSCOPIC PICTURES.

Specification of Letters Patent No. 24,327, dated June 7, 1859.

*To all whom it may concern:*

Be it known that I, STUART PERRY, of Newport, in the county of Herkimer and State of New York, have invented a new and useful Improvement in Apparatus for Exhibiting Stereoscopic Pictures; and I do hereby declare the following to be a full, clear, and exact description of the construction and operation of the same, reference being had to the accompanying drawings, making a part of this specification, in which—

Figure 1, represents a perspective view of the exterior of the box or case, which contains the pictures, and the mechanism for moving them to, and from the place where they are exhibited. Fig. 2, represents an elevation of the interior mechanism the box, or case being removed. Fig. 3, represents a section through the picture holder, and the frame over it, and Fig. 4, represents a portion of the frame or mechanism by which the pictures are taken to the place where they are to be inspected, and again returned to the picture holder, or interior of the box.

Similar letters of reference where they occur in the separate figures denote like parts of the apparatus in all of them.

My invention relates to an apparatus for exhibiting stereoscopic pictures, in which the pictures are conveyed automatically from the interior of the box or case, to the place where they are to be inspected, and returned to the box again after they have been inspected or exhibited—or in other words— an apparatus which contains the pictures within it, and brings them to the outside to be exhibited, and then returns them again. And the nature of my invention consists in mechanical means which I employ to perform the several necessary movements to effect the desired object, as will be hereafter explained.

To enable others skilled in the art to make and use my invention I will proceed to describe the same with reference to the drawings.

A represents a box or case which may be made of any suitable material, and ornamented at pleasure. Upon the top of this box or case (though it may be at either of the sides, if so preferred) is a frame B, into which the picture may be brought when it is to be inspected. This frame too may be highly wrought or ornamented, as the whole thing may constitute a handsome parlor ornament, or piece of furniture. On each side of this frame B, may be arranged two frames C, C, for containing lenses, said lenses being arranged in an inner frame C' that can be moved in or out of the stationary frame C, by a thumb screw D, for the purpose of changing the focus to suit the eye of the person examining the pictures. By this arrangement of frame and lenses, two persons may examine pictures at the same time, the pictures being placed, or clamped, or glued, in pairs, so as to face both ways, or toward both lenses. A crank E, is connected to the protruding end of a shaft $a$ that operates the interior mechanism, said crank being in any convenient position, for the operator or user of the apparatus to catch or turn. Within this outer box or case A is the picture holder F, which may be cylindrical in form, and divided by proper partitions $b$, into a series of compartments or divisions $c$. The picture holder is hung upon an axle or shaft $d$ upon which it can turn, and revolves within a stationary barrier which may have closed heads $e$, and a rim $f$, or they may be made in skeleton form, their object being to hold the pictures to their proper places and prevent them from dropping out. When the pictures are moved horizontally, and exposed at the side of the box, instead of vertically as shown at the top, then the barrier may be differently made, as there would be no tendency for them to drop out of their compartments.

On the shaft $a$, to which the crank E is connected, is an arm G, which has a wrist pin $i$, in its end that works in a horizontal slot $n$ made in the lifting or carrying frame H, that transfers the pictures in succession from the interior of the box to the frame B, where they are inspected and then back again to the compartment from whence they were taken. The frame H, is seen in perspective in Fig. 4. The pictures $o$, rest in their respective compartments $c$, loosely but are prevented from falling out as the picture holder revolves, by the belt or barrier $f$. The ends of the pictures project beyond the ends of their compartments far enough to be caught by the portions $r$, $r$ of the frame H, and as said frame rises by the action of the crank G, wrist pin $i$, and slot $n$, it carries up the picture through a slot in the barrier $f$, and in the box or case A, into the frame B, where it can be inspected through the glasses in C'. By continuing the rotation of the crank E, the frame descends, and carries down the picture through the same opening that it was brought up through; and just as the picture is rested in its compartment, a tooth s on the shaft a takes in between two of the cogs or teeth of the wheel I, and gives said wheel a slight rotation, just sufficient to remove the picture, just exhibited and returned, far enough out of the way, to allow the frame to bring up the next one. The wheel I is fast on the shaft d, that carries the picture holder, so that moving the shaft, moves the picture holder also.

t is a spring or friction brake, that is forced against the wheel I, or its teeth, for the purpose of holding the picture-holder in the position in which the tooth s leaves it—it being understood that while the picture is being carried out to be exhibited as well as when being returned to its compartment, the picture-holder is at rest, and that it is only moved far enough to bring each picture opposite the opening through which it is to be protruded, in regular succession. It is immaterial however, whether each compartment has a picture in it or not, as their absence in no wise disarranges any of the mechanism.

The frame B, is made in sections that may slide together, or one may be hinged to the other and secured by any ordinary fastening. This is for the purpose of taking out, changing, or introducing the pictures. By sliding up one half of the frame B, and taking it away from the other part, and turning the crank E, the pictures are brought up, and can be lifted off their supports r, and others put in their place, and continuing to turn the crank the new picture is carried down to the compartment from which the one removed came, and so on the pictures can be changed at pleasure, as they are united or made fast to nothing, being entirely loose, and each independent of the other.

I propose to fasten two pictures together either by metallic clamps, and back to back, or by gluing them—either of which will make the paper stiffer, and less liable to warp, and consequently more certain of not catching in the narrow slot or opening through which they are projected for inspection.

J, is a guide or block fastened to the frame H, and moving in the ways K, to keep the frame in position.

The mechanism is exceedingly simple, and the whole apparatus neat and ornamental. Among its many advantages over other apparatus for a similar purpose, may be mentioned the following. That the pictures are kept in a tight box where they cannot be handled or soiled. There are not doors or lids to open or close. The pictures are all brought into the same position, and consequently when the lenses are set properly, there is no shifting or turning of the picture, necessary. It is always in the right place, and the light is always sufficient.

When transparent pictures are to be exhibited, they are introduced singly (not back to back), and only one set of lenses used. A glass case or other cover is placed so as to properly inclose the frame in which the pictures are exhibited, and the set of lenses on the face side of the picture, and excluding the light on that side. This case should be removable, for with the pictures on paper, it is not needed.—By transparent pictures, I mean those on glass.

I have described the picture holder as a rotating one. It is not necessarily rotative, as it may move on ways; but any movable picture holder with divisions for holding the pictures, out of which, or nearly out of which, the pictures are successively removed for exhibition, and to which they are again returned, and for which purpose there is an alternate motion, and state of rest, or partial cessation of motion of the frame work of the picture holder, I would deem as my invention, whether the pictures were projected out vertically or horizontally. Keeping the pictures in a box and mechanically displaying them outside of the box, and returning them again, is a leading element in my invention, though there are others of equal importance, as will be readily discovered.

Having thus fully described the nature and object of my invention what I claim therein as new and desire to secure by Letters Patent is—

1. A movable frame work for holding a series of stereoscopic pictures, from which the pictures are brought to be inspected, and then returned to it again, by a mechanism operated by the user, substantially as described.

2. I also claim bringing each individual picture or pair of pictures in succession to the same point or place, before they are projected from their compartment to be exhibited, by mechanism, substantially such as described.

3. I also claim in combination with a movable picture holder, a reciprocating carrying frame that catches each picture or pair of pictures in succession, and carries them to the place where they are to be inspected, and returns them to their compartment again, substantially as described.

4. I also claim in combination with a box or case containing within it a series of pictures, and a mechanism for projecting them from said case, a frame work on the outside of said box or case, for receiving said pictures, substantially as described.

5. I also claim the slots, in the picture-holder barrier $f$, and in the box or case, so that the picture from its compartment in the picture holder, may be projected through both slots or openings, to the outside of the box, substantially as described.

6. I also claim the friction break $t$ or its equivalent for holding the picture holder, and preventing it from moving until started by the crank, substantially as described.

7. I also claim making the frame B, in sections or with an opening for the purpose of introducing the pictures through said frame into the compartments of the picture-holder, as well as removing them therefrom, substantially as described.

8. I also claim the clamps as applied to single or double pictures, for the purpose of strengthening them, preventing their warping or bending, and thus facilitating their passage through the slot which they must pass through to the place where they are exhibited, substantially as described.

STUART PERRY.

Witnesses:
WILLIAM CHAPMAN,
ISAAC SMITH.